R. H. WHITE.
TRACK LAYING TRACTOR.
APPLICATION FILED NOV. 18, 1918. RENEWED SEPT. 15, 1919.
1,338,060.                                    Patented Apr. 27, 1920.
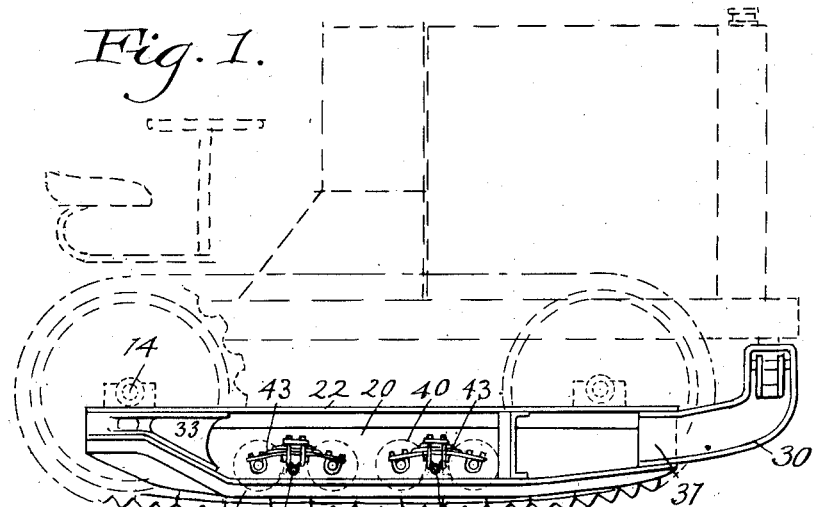
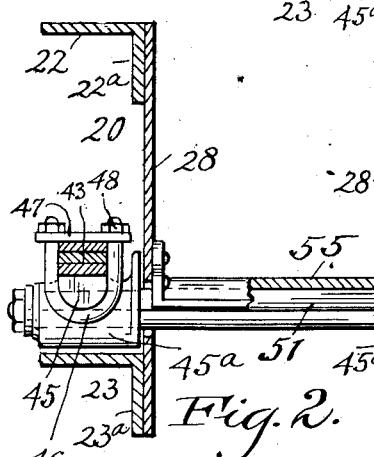
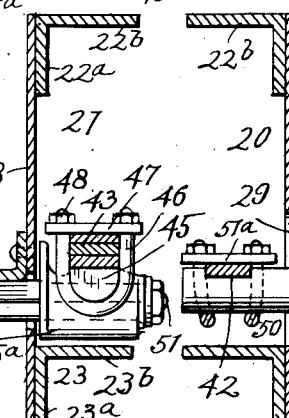
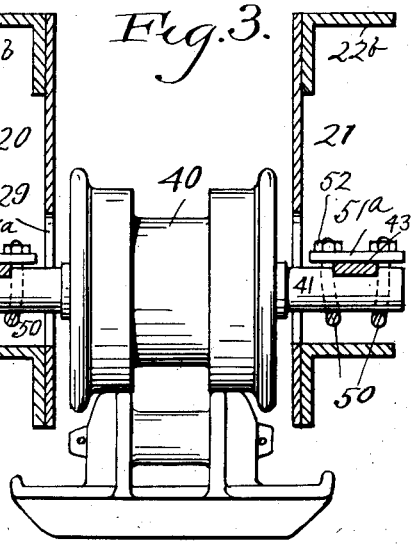
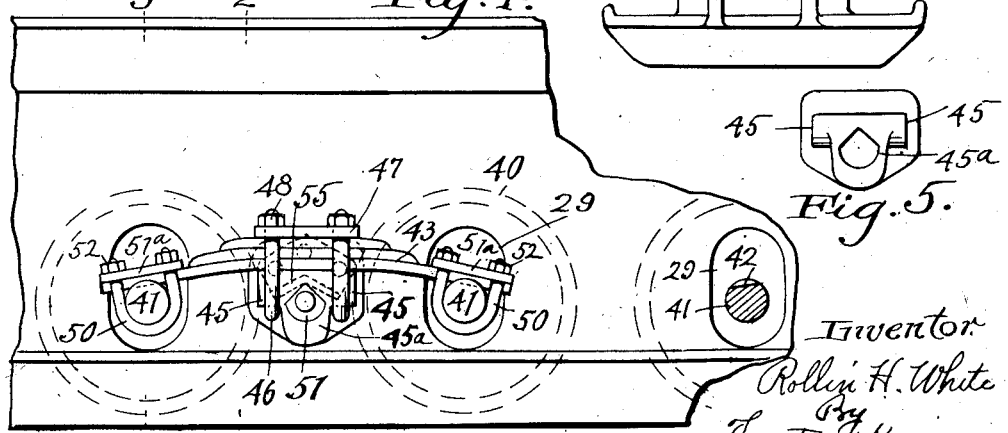

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACK-LAYING TRACTOR.

1,338,060.    Specification of Letters Patent.    Patented Apr. 27, 1920.

Application filed November 18, 1918, Serial No. 262,938. Renewed September 15, 1919. Serial No. 324,000.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Track-Laying Tractors, of which the following is a full, clear, and exact description.

This invention relates to the kind of track laying tractors which are typified by the tractor which forms the subject matter of my prior Patent No. 1,253,319, issued Jan. 15, 1918, in which each track belt is associated with the track frame and runs over two end wheels, one of which is a driving sprocket.

The present invention has to do with the mounting upon the truck frames of wheels located between the end wheels for engagement with the ground reaches of the track belt,—the objects being to yieldingly hold said ground reaches of the track belt in contact with the ground, however uneven it may be; to materially relieve the machine from the shocks and jars incident to traveling over very rough ground; and to accomplish these results by means which are inexpensive and are constructed and disposed so that they are equally accessible for repair and replacement whenever necessary.

The invention consists in the construction and combination of parts shown in the drawing and hereinafter described and pointed out definitely in the appended claims.

In the drawings, Figure 1 is a side elevation which shows in full lines and dotted lines a tractor in which the present invention is embodied; full lines showing a track frame which is the part of the tractor to which the present invention is applied. Fig. 2 is a vertical transverse section through said track frame in the plane indicated by line 2—2 on Fig. 4. Fig. 3 is a vertical transverse section in the plane of line 3—3 on Fig. 4. Fig. 4 is an enlarged side elevation of a part of one truck frame, and one pair of track wheels and the mechanism associated therewith. Fig. 5 is a detached side elevation of a spring seat block.

The truck frame to which the present invention is applied, as shown in the drawing, is very much like that which is shown and described in my prior application No. 216,551, filed Feb. 11, 1918. Each truck frame is made up of two parallel vertically disposed longitudinally extended built up beams 20, 21, which are connected at their front ends by a yoke 30, and at their rear ends are hung upon lateral extensions of the rear axle 14.

Each beam comprises a straight upper tension member 22, and a bent lower compression member 23, which members are connected together at their front and rear ends, their front ends being connected to an arm 31 of the front yoke, and their rear ends being connected to an interposed block 33. Each tension member and each compression member is an angle bar. Each beam also includes the guard plate 28 which is riveted against the inside faces of the vertical webs 22$^a$ and 23$^a$ of said angle bars. Each angle bar has an outwardly extended flange, that is, a flange which extends away from the guard plate, the flanges of the upper members being indicated by 22$^b$ and of the lower members by 23$^b$.

It is to be understood, as a matter of course, that the present invention does not require the employment of track frame beams constructed precisely as described.

Associated with each truck frame are one or more pairs of track wheels 40, two of such pairs being shown in Fig. 1. Each of such track wheels is located between the guard plates 28 of the two track beams, and is rotatably mounted upon a transverse shaft 41, which extends through holes 29 in both guard plates and is secured to the ends of two leaf springs 43. There are two of such leaf springs associated with each pair of track wheels, one associated with each track beam. Each leaf spring is secured to a spring seat block 45$^a$, and the two spring seat blocks are rigidly secured to the ends of a transversely extended rock shaft 51, which extends through the guard plates of both beams.

A cradle bar 55 extends between and is rigidly secured to the two side beams of the track frame by rivets, spot welds or the like. In the lower face of this cradle bar there is an obtuse V-shaped longitudinal recess. The rock shaft is acutely V-shaped or knife edged on its upper side, and engages after the fashion of a knife edge in the V-shaped recess in the cradle bar so that the rock shaft may rock freely on this V-shaped edge as a fulcrum. As stated, this rock shaft extends through holes in both guard plates. The spring seat blocks are rigidly secured upon its projecting ends, close to the guard plates, so as to prevent any substantial endwise movement of said rock shaft. These blocks extend downward below the rock shaft to a position such that their lower edges are close to the horizontal flanges of the lower angle bars when the knife edge of the shaft is engaging the cradle bar. Therefore, this rock shaft can not drop with respect to the cradle bar far enough to get out of the V-shaped groove therein. Each spring seat block has the forwardly and rearwardly extended spring seat arms 45. The middle part of each leaf spring rests upon the associated spring seat, (which is the top of the block and of the arms) and is secured thereto by U-bolts 46 which embrace the arms 45 and extend upward on opposite sides of the spring, the clamping plates 47 which rest upon said spring, and the nuts 48. The leaf springs extend forwardly and rearwardly from these spring seat blocks, and one of the shafts 41 extends between and is secured to the front ends of the two leaf springs, while the other shaft extends between and is secured to the rear ends of said two leaf springs.

Nonrotative connections between the shafts and leaf springs are made by forming in the shafts flat faced notches 42 in which the leaf springs are fitted. U-bolts 50 which embrace the shafts and extend upward through clamping plates 51ª,—which clamping plates are held down upon these springs and in turn hold the springs in said notches by nuts 52.

As before stated, there may be and should be as many of these pairs of engaging track wheels as may be necessary to substantially hold the entire ground reach of the track belt in contact with the ground, two of such pairs being necessary in the particular machine shown in the drawing.

The specific features of the construction shown and described may be varied as desired; and are not to be regarded as essential parts of the constructions severally defined by the claims unless definitely specified in said claims.

The two track wheels are, therefore, located in operative position between the two side beams of the track frame. They are carried by opposite ends of two equalizer bars which are respectively located outside of the track frame beams, whereby they are easily accessible; and these two equalizer bars are connected at their front and rear ends so that they operate in unison. These equalizer bars as shown are leaf springs, and therefore are resilient. Therefore, by the concurrent automatic rocking of the equalizer bars, the supported weight is equally distributed to the two track wheels however, uneven may be the ground surface on which the track belt is laid down. Likewise the equalizer bars, because made up of leaf springs, will absorb in a large degree the jars and shocks which the track frame would otherwise suffer in traveling on tracks laid down upon such uneven ground.

Having described my invention, I claim:—

1. In a track laying tractor, the combination of a track frame comprising two parallel longitudinally extended side beams, two spring seat blocks located in transverse alinement outside of and close to the two side beams, said two spring seat blocks having a rocking connection with the track frame, a leaf spring secured near its middle to each spring seat block and extended forwardly and rearwardly therefrom, two transversely extended shafts which respectively connect the front ends of said springs and the rear ends of said springs, and track wheels rotatably mounted upon said shafts between said side beams.

2. In a track laying tractor, the combination of a track frame comprisng two parallel longitudinally extended side beams, two rigidly connected spring seat blocks located in transverse alinement outside of and close to the two side beams, said two spring seat blocks having a rocking connection with the track frame, a leaf spring secured near its middle to each spring seat block and extended forwardly and rearwardly therefrom, two transversely extended shafts which respectively connect the front ends of said springs and the rear ends of said springs, and track wheels rotatably mounted upon said shafts between said side beams.

3. In a track laying tractor, the combination of a track frame comprising two parallel longitudinally extended side beams, a transversely extended rocker which is supported by said track frame, two spring seat blocks fixed to said rocker adjacent said side beams, a leaf spring secured near its middle to each spring seat block and extended forwardly and rearwardly therefrom, two transversely extended shafts which respectively connect the front ends of said springs and the rear ends of said springs, and track wheels rotatably mounted upon said shafts between said side beams.

4. In a track laying tractor, the combination of a track frame comprising two parallel longitudinally extended side beams, a cradle bar extended between and connected with said two side beams and having a recess in its lower face, a transversely extended rock shaft having a knife-edged upper surface which engages with said cradle bar, and said rock shaft being extended at its ends through both side beams of the track frame, spring seat blocks which are nonrotatably fixed to the ends of said rock shaft, a leaf spring secured near its middle to each spring seat block and extended forwardly and rearwardly therefrom, two transversely extended shafts which respectively connect the front ends of said springs and the rear ends of said springs, and track wheels rotatably mounted on the said shafts between the side beams of the track frame.

5. In a track laying tractor, the combination of a track frame which includes two parallel longitudinally extended side beams, two longitudinally extended equalizer bars, which are respectively located outside of and close to the side beams and are pivoted thereto on alined axes, a transversely extended shaft which is connected to the front end of said two equalizer bars, a second transversely extended shaft which is connected to the rear end of the said equalizer bars, and rotatable track wheels upon said two shafts between the two side beams of the track frame.

In testimony whereof I hereunto affix my signature.

ROLLIN H. WHITE.